(12) United States Patent
Ripley et al.

(10) Patent No.: US 9,227,607 B1
(45) Date of Patent: Jan. 5, 2016

(54) APPARATUS, METHOD AND SYSTEM FOR MONITORING TOWED VEHICLES IN A TRACTOR-TRAILER VEHICLE

(71) Applicant: Bendix Commercial Vehicle Systems, LLC, Elyria, OH (US)

(72) Inventors: John V. Ripley, Elyria, OH (US); Majed M. Hamdan, North Olmsted, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 14/470,934

(22) Filed: Aug. 27, 2014

(51) Int. Cl.
| G06F 7/70 | (2006.01) |
| G06F 19/00 | (2011.01) |
| B60T 8/18 | (2006.01) |
| B60T 8/17 | (2006.01) |

(52) U.S. Cl.
CPC ............. *B60T 8/1806* (2013.01); *B60T 8/1708* (2013.01); *B60T 8/1887* (2013.01); *B60T 2230/06* (2013.01); *B60T 2250/02* (2013.01); *B60T 2270/88* (2013.01)

(58) Field of Classification Search
CPC combination set(s) only.
See application file for complete search history.

(56) References Cited

U.S. PATENT DOCUMENTS

| 4,743,888 | A | 5/1988 | Hilpert et al. |
| 5,025,253 | A | 6/1991 | DiLullo et al. |
| 5,327,781 | A | 7/1994 | Moran et al. |
| 5,523,947 | A | 6/1996 | Breen |
| 5,677,667 | A | * 10/1997 | Lesesky et al. ............... 340/431 |
| 5,693,985 | A | 12/1997 | Gee et al. |
| 6,127,939 | A | 10/2000 | Lesesky et al. |
| 6,237,401 | B1 | 5/2001 | Haehn et al. |
| 6,501,376 | B2 | 12/2002 | Dieckmann et al. |
| 6,894,601 | B1 | 5/2005 | Grunden et al. |
| 7,307,514 | B2 | 12/2007 | McAden |
| 7,415,325 | B2 | 8/2008 | Knosmann et al. |
| 7,760,077 | B2 | 7/2010 | Day |
| 7,932,815 | B2 | 4/2011 | Martinez et al. |
| 8,098,145 | B2 | 1/2012 | Ancuta et al. |

(Continued)

FOREIGN PATENT DOCUMENTS

EP     1013533     7/2004

OTHER PUBLICATIONS

Bendix, Bendix Service Data SD-13-4861, Bendix(R)ATR-6(TM) and ATR-3(TM) Antilock Traction Relay Valves, Apr. 2008, pp. 1-8.

(Continued)

*Primary Examiner* — Thomas Tarcza
*Assistant Examiner* — Edward Pipala
(74) *Attorney, Agent, or Firm* — Mathews Law Firm LLC (57) ABSTRACT

Various examples of a controller, method and system for monitoring a tractor-trailer vehicle train are disclosed. In one example a tractor controller is manually-initiated or a user-initiated tractor controller and includes an electrical control port for receiving an electrical sync signal and an electrical start signal, and a communications port for receiving data. A processing unit of the tractor controller includes control logic and is in communication with the electrical control port. The control logic is capable of receiving a data signal at the communications port which includes a time value and a unique identification which corresponds to the towed vehicle in response to the electrical start signal. At a predetermined response time, the tractor controller determines the position of the towed vehicle in the tractor-trailer vehicle train based on the data received from the towed vehicles.

34 Claims, 8 Drawing Sheets

(56) References Cited

U.S. PATENT DOCUMENTS

| | | |
|---|---|---|
| 8,179,238 B2 | 5/2012 | Roberts et al. |
| 8,346,407 B2 | 1/2013 | Schneider et al. |
| 2004/0187674 A1* | 9/2004 | Bennett et al. ............ 91/418 |
| 2007/0225872 A1 | 9/2007 | Luebke et al. |
| 2010/0271189 A1 | 10/2010 | Miller et al. |
| 2012/0146779 A1 | 6/2012 | Hu et al. |
| 2013/0148748 A1 | 6/2013 | Suda |
| 2014/0081543 A1 | 3/2014 | Fry |

OTHER PUBLICATIONS

Bendix, Bendix Service Data SD-03-1064, Bendix(R)R-12(TM) and R-14(TM) Relay Valves, Mar. 2004, pp. 1-6.

Bendix, Bendix Service Data SD-06-1800, Bendix(R) SL-3(TM) and SL-4(TM) Stop Light Switch, Jun. 2011, pp. 1-4.

* cited by examiner

APPARATUS, METHOD AND SYSTEM FOR MONITORING TOWED VEHICLES IN A TRACTOR-TRAILER VEHICLE

BACKGROUND

The present invention relates to aspects of an apparatus, method, and system for monitoring towed vehicles of a tractor-trailer vehicle. A tractor-trailer vehicle, which is equipped with a pneumatic brake system, includes a tractor and one or more towed vehicles depending upon the pay load and the regulations. Towed vehicles include trailers as well as dollies that are placed between trailers. A typical maximum number of towed vehicles in the towed vehicle train is five towed vehicles, for example, a "turnpike triple" which is made up of three trailers and two dollies.

In current tractor-trailer vehicle systems the tractor controls the diagnostics for the entire vehicle system. The tractor treats the towed portion of the vehicle train as a "dumb" vehicle, that is, the towed vehicle train is treated as an extension of the tractor. In reality, the length and weight of the vehicle train has substantial impact on the stability and control of the tractor-trailer vehicle, and the size and weight of the vehicle train can also vary from trip to trip, but nevertheless, the towed portion of the vehicle train is recognized as part of the same tractor. Currently there are no means by which a tractor can determine how many towed vehicles it has connected to it or the location or type of towed vehicle in the vehicle train at any given time.

SUMMARY

Various example embodiments of controllers for monitoring the vehicle train of a tractor-trailer vehicle are disclosed. In accordance with one aspect, a tractor controller of a tractor-trailer vehicles includes an electrical control port for receiving a sync signal and a start signal, and a communications port for receiving data from a towed vehicle of a tractor-trailer vehicle that receives the electrical sync signal and the electrical start signal. A processing unit of the tractor controller is in communication with the electrical control port and the communications port, and the processing unit includes control logic. The control logic is capable of: receiving a data signal at the communications port in response to the towed vehicle receiving the electrical start signal, wherein the first data signal comprises a time value and a unique identification which corresponds to the towed vehicle; and calculating, at a predetermined response time, the position of the towed vehicle in the tractor-trailer vehicle based on the data signal received.

In accordance with another aspect of the present invention, a tractor controller includes an electrical control port for transmitting an electrical signal to a tractor pneumatic source, and a communications port for receiving data. A processing unit of the tractor controller is in communication with the electrical control port and the communications port and includes control logic. The control logic is capable of: transmitting a sync signal to the towed vehicle train; transmitting an electrical start signal to the tractor pneumatic valve at a predetermined time period after transmitting a sync signal; receiving a first data signal comprising a time value and a unique identification at the communications port from the towed vehicle in response to transmitting the electrical start signal; and calculating, at a predetermined response time, the position of the towed vehicle in the tractor-trailer vehicle based on the data signal received.

In accordance with another aspect of the present invention, a towed-vehicle controller of a tractor trailer vehicle includes a first electrical control port for receiving an electrical sync signal and an electrical start signal from a tractor, a second electrical control port for receiving an electronic pressure signal from a tractor pneumatic source, and a communications port for transmitting data. A processing unit of the towed-vehicle controller includes control logic and is in communication with the first electrical control port, the second electrical control port and the communications port, and includes control logic capable of: transmitting a data signal comprising a time value and a unique identification to the tractor in response to receiving an electronic pressure signal from the tractor pneumatic source.

In accordance with another aspect of the present invention, a method for monitoring a vehicle train of a tractor-trailer vehicle includes transmitting a sync signal from a tractor vehicle to a towed vehicle of the tractor-trailer vehicle; transmitting an electrical start signal and an electronic pressure signal to the towed vehicle at a predetermined time period after transmitting the sync signal; transmitting a data signal from the towed vehicle to the tractor vehicle in response to receiving the electronic pressure signal, the data signal comprising a time value and a unique identification; and determining the position, at a predetermined response time, of the towed vehicle based on the data signal received by the tractor vehicle.

In accordance with another aspect of the present invention, a system for monitoring a tractor-trailer vehicle train includes a tractor pneumatic source, a stoplight switch in communication with the tractor pneumatic source, and a tractor pneumatic source which is in communication with the pneumatic control valve. The system also includes a tractor controller which includes an electrical port for receiving an electrical sync signal and an electrical start signal; a communications port for receiving data from a towed vehicle of the tractor-trailer vehicle and which also receives a sync signal and a start signal; and a processing unit comprising control logic. The processing unit is in communication with the communications port, and the control logic is capable of: receiving a first data signal from the towed vehicle that responds to the electrical start signal at the communications port, the first data signal comprising a first time value and a unique identification which corresponds to the towed vehicle; and calculating, at a predetermined response time, the position of a towed vehicle in the tractor-trailer vehicle based on the data signal received.

BRIEF DESCRIPTION OF THE DRAWINGS

In the accompanying drawings which are incorporated in and constitute a part of the specification, example embodiments of the invention are illustrated, which, together with a general description of the invention given above, and the detailed description given below, serve to exemplify some aspects of this invention.

DETAILED DESCRIPTION

Example embodiments of the present invention are directed to monitoring a towed vehicle train of a tractor-trailer vehicle. The number of towed vehicles and the relative positions in the vehicle train can be determined. This allows designers of advanced vehicle systems more latitude in design, such as, advanced braking and communication systems the ability to design features that incorporate the entire vehicle train. Aspects of the present invention disclosed herein allow new functions, diagnostics and prognostics of tractor-trailer vehicles which are currently unattainable.

In one aspect the tractor controller can determine the location of the trailers in the vehicle train. The tractor sends electrical and pneumatic signals to the towed vehicles behind it and receives data or information that allows the tractor to make determinations and/or calculations based on the information reported by the trailers and/or dollies. The tractor controller can determine at least one of the number, sequence, and length of the towed vehicles behind it.

Figure 1:
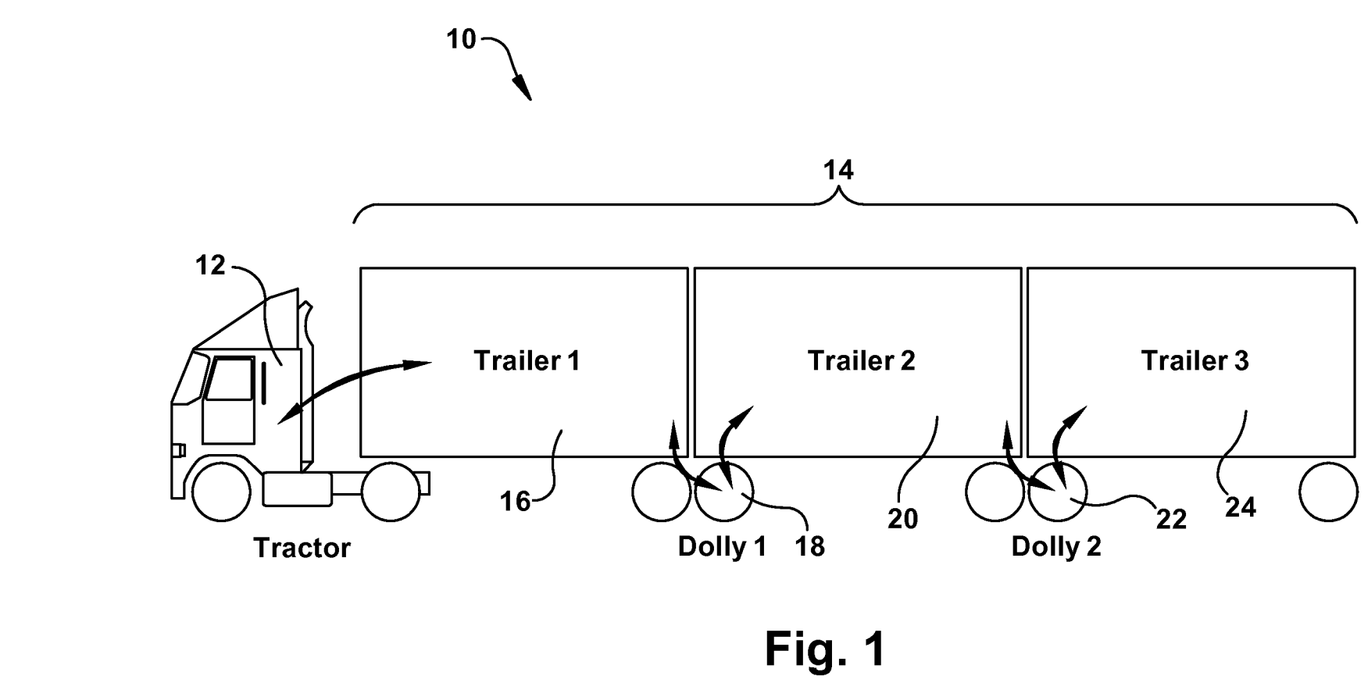
FIG. 1 illustrates a schematic representation of a tractor-trailer system, according to an example embodiment of the present invention.

FIG. 1 is a schematic illustration of a tractor-trailer vehicle train 10, for example an air brake tractor-trailer vehicle train 10, according to an example embodiment of the present invention. Tractor-trailer vehicle train 10 includes a towing vehicle 12, or "tractor" and a plurality of towed vehicles pulled by the tractor 12. The towed portion 14 of the vehicle train includes one or more towed vehicles for example trailers 16, 20 and 24, and dollies 18 and 22 which are located between the trailers. The specific number of trailers, dollies and combinations thereof can vary and is not limited by this application, although the maximum number of towed vehicles can vary according to applicable state law.

Figure 2:
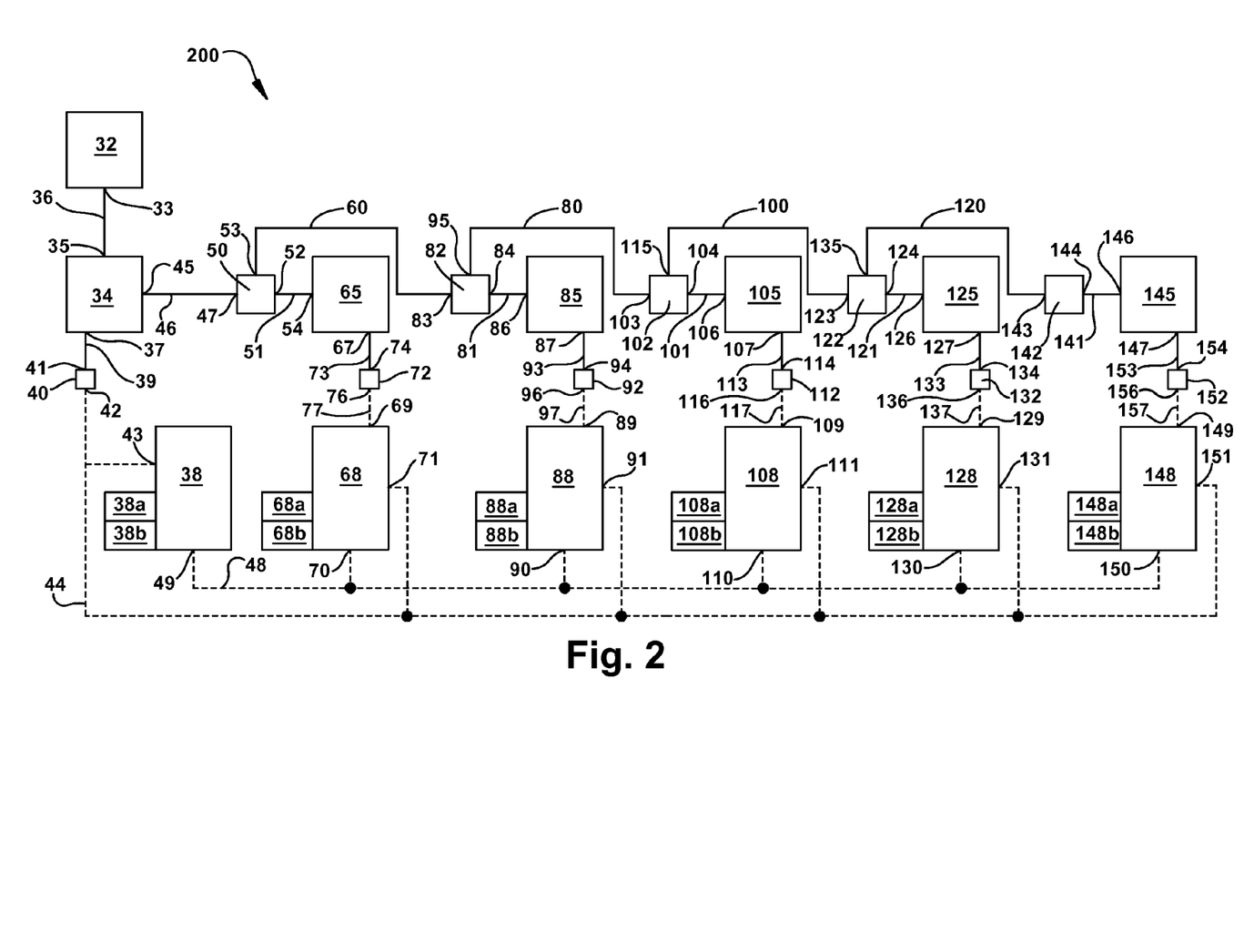
FIGS. 2 through 5 illustrate schematic representations of a vehicle train sensor system of the tractor-trailer system of FIG. 1, according to example embodiments of the present invention.

FIG. 2 through FIG. 5 illustrate electrical and pneumatic components for a tractor and five towed vehicles comprising trailers and dollies as shown in FIG. 1, however, in alternative embodiments additional or fewer vehicles, and different combinations of the number and type of towed vehicles are possible. FIG. 2 is a schematic illustration of a vehicle-train monitoring system 200 of tractor-trailer vehicle train 10 shown in FIG. 1, according to an aspect of the present invention. The vehicle-train monitoring system 200 is a manual or "user-initiated" system and is used for determining the number, the positions, and the length, of the towed vehicles in the towed portion 14 of the tractor-trailer vehicle train 10.

Monitoring system 200 includes tractor components such as tractor pneumatic control valve 32 which has delivery port 33 in communication with the tractor pneumatic source 34, which can include a pneumatic valve such as a "tractor relay valve," for example the R-12™ relay valve from Bendix Commercial Vehicle Systems, LLC of Elyria, Ohio. Tractor controller 38 or "ECU" includes processor 38a, control logic 38b, input control port 43, and bi-directional communication port 49. Stoplight switch 40 has a pneumatic input port 41 and electrical output port 42 in electrical communication with tractor controller 38 and towed vehicles. A suitable stoplight switch 40 associated with tractor pneumatic valve 34 is SL4™ by Bendix Commercial Vehicle Systems, LLC of Elyria, Ohio.

Vehicle-train monitoring system 200 of FIG. 2 also illustrates several towed-vehicle components including a series of pneumatic control valves 65, 85, 105, 125, and 145, associated pressure sensors, 72, 92, 112, 132, and 152, and towed-vehicle controllers, or "ECUs" 68, 88, 108, 128, and 148 associated with trailer and dolly vehicles 16, 18, 20, 22 and 24 (FIG. 1), respectively. Control valves 65, 85, 105, 125, and 145 have control ports 54, 86, 106, 126, 146, respectively, and delivery ports 67, 87, 107, 127, and 147, respectively. Pressure sensors, 72, 92, 112, 132, and 152 have pneumatic input ports 74, 94, 114, 134, and 154, respectively, and electrical outlet ports 76, 96, 116, 136, and 156, respectively. Towed-vehicle controllers 68, 88, 108, 128, and 148 have sensor input ports 69, 89, 109, 129, and 149, respectively, stoplight switch (SLS) input ports 71, 91, 111, 131, and 151, respectively, and bi-directional communication ports 70, 90, 110, 130, and 150, respectively. Each of the towed-vehicle controllers 68, 88, 108, 128, and 148 include processing units 68a, 88a, 108a, 128a, and 148a, and control logic 68b, 88b, 108b, 128b, and 148b, respectively. In an alternative example, each of the control valves 65, 85, 105, 125, and 145 can be combined with each of the towed-vehicle controllers 68, 88, 108, 128, and 148, respectively as a single unit in each towed vehicle. For example, control valve 65 can be combined with towed-vehicle controller 68 as a single unit. In another example, each of the pressure sensors, 72, 92, 112, 132, and 152 can also be included with a control valve and a towed-vehicle controller, such as for example, an integrated unit that includes control valve 65, towed-vehicle controller 68 and pressure sensor 72.

Optionally, vehicle-train monitoring system 200 includes pneumatic booster valves 50, 82, 102, 122, 142, associated with towed vehicles 16, 18, 20, 22 and 24 (FIG. 1), respectively. Booster valves 50, 82, 102, 122, 142 include control ports 47, 83, 103, 123, and 143, and delivery ports 52, 84, 104, 124, and 144.

In a user-initiated monitoring system, as illustrated in FIG. 2, the tractor's manually-operated pneumatic control valve 32 has pneumatic delivery port 33 and communicates pneumatically with tractor pneumatic source 34 at tractor pneumatic control port 35 via delivery pathway 36. An example of a manually-operated pneumatic control valve 32 can be a foot-operated pneumatic control valve, such as a brake pedal. In such case, pneumatic control valve 32, when manually activated, can convey low pressure, for example up to about 6 psi of air pressure, to tractor pneumatic source 34, for example, a pneumatic valve.

Pneumatic air delivered from delivery port 37 of pneumatic source 34 travels via pneumatic line 39 to input port 41 of stoplight switch 40 which transmits an electrical signal via output port 42 along electrical line 44 to tractor controller 38 at least one towed vehicle of vehicle train. For example, electrical signal is transmitted along stoplight switch electrical line 44 to tractor controller 38 via input port 43 and to SLS input ports 71, 91, 111, 131 and 151 of towed-vehicles controllers 68, 88, 108, 128 and 148 of towed vehicles 16, 18, 20, 22 and 24 (FIG. 1). The electrical signal transmitted by the stoplight switch 40 along electrical line 44 is a "sync signal" or initial signal conveyed to the tractor and towed vehicles in response to a manual input from the vehicle operator. For example, the sync signal can be manually triggered when the vehicle operator depresses the foot pedal one or more times. This provides an indication to the tractor controller and towed-vehicle controllers, in a synchronized manner, that a "predetermined time period," a period between sync signal and start signal, has begun and that the tractor controller and the towed-vehicle controllers will recognize a forthcoming "start signal." The duration of the predetermined time period can vary but is typically very brief. For example, the predetermined time period can range from about 0.01 seconds to about 10 seconds, in another example from about 0.01 to about 7 seconds, and more commonly in another example, the predetermined time period can range from about 0.1 second to about 1 second. The electrical start signal is likewise transmitted by the stoplight switch 40 along electrical line 44 conveyed to the tractor and towed vehicles in response to a manual input from the vehicle operator. For example, the start signal can be manually triggered when the vehicle operator depresses the foot pedal at the predetermined time subsequent to the initial sync signal or series of sync signals.

The tractor pneumatic source 34, in addition to sending air to the stoplight switch 40 which sends the electrical sync signal and the start signal to the tractor controller 38 and the towed vehicles, also sends a air to the towed-vehicle pneumatic control valve 65. That is, tractor pneumatic source 34 transmits air from delivery port 45 via pneumatic lines 46 and 51 to the control port 54 of pneumatic control valve 65 of towed vehicle. Pneumatic control valve 65 is in communication with towed-vehicle pressure sensor 72 which converts the air pressure to an electrical signal. Pneumatic control valve 65 sends air via delivery port 67 and air delivery pathway 73 to input port 74 of sensor 72 and an electrical signal is transmitted from sensor 72 from electrical output port 76 to towed-vehicle controller 68 via electrical pathway 77.

Monitoring system 200 optionally includes pneumatic booster valve 50 which has ports 47, 52, and 53 and is disposed between tractor pneumatic source 34 and towed-vehicle pneumatic control valve 65. Pneumatic booster valve 50 is in pneumatic communication with towed-vehicle pneumatic control valve 65 via pneumatic pathway 51 and pneumatic control port 54. In vehicle trains with more than one towed vehicles, for example trailer 16 (FIG. 1) pneumatic booster valve 50 is in communication with the pneumatic booster valve 82 of a second towed vehicle, for example, dolly 18 (FIG. 1) via air delivery pathway 60. Similarly booster valve 82 is in communication with booster valve 102 of a third towed vehicle, for example, trailer 20 (FIG. 1) via delivery pathway 80, booster valve 122 is in communication with adjacent booster valve 102 of a fourth towed vehicle, for example, dolly 22 (FIG. 1) via delivery pathway 100, and booster valve 142 is in communication with adjacent booster valve 124 of a fifth towed vehicle, for example, trailer 24 (FIG. 1) via delivery pathway 120.

FIG. 2 shows that each towed vehicle in vehicle-train monitoring system 200 includes pneumatic pressure sensors 72, 92, 112, 132, 152 which monitor the arrival of a air pressure signal at each towed vehicle and transmit an electronic pressure signal to its respective towed-vehicle controller 68, 88, 108, 128, and 148, respectively. Since it will take a noticeably longer time for the air to travel a greater distance to each successive towed vehicle, each towed-vehicle controller will receive the electronic pressure signal from the pressure sensors at a different time. Each towed-vehicle controller receives the sync and start times from the stoplight electrical line 44 and subsequent pressure signal from sensors. The difference in time, Δt, between the receipt of the electronic pressure signal and the start time is successively greater for each towed vehicle. The time difference, Δt, depends at least upon the distance the particular towed vehicle is behind the tractor and also the length of the towed vehicle.

Tractor controller 38 which can determine the number and sequence and length of the towed vehicles behind the tractor 12 (FIG. 1) receives a data signal from each of the towed vehicle controllers. In response to the towed-vehicle controllers receiving its respective pressure signal from pressure sensors 72, 92, 112, 132, 152 the towed-vehicle controllers 68, 88, 108, 128, and 148 transmit a data signal via bi-directional communication ports 70, 90, 110, 130, and 150 to tractor controller 38 via communication path 48. Communication path 48 is a bi-directional communication path between the tractor controller 38 and one or more towed-vehicle controllers that are physically or wirelessly connected to the communication path 48. In one example, communication path 48 is a hard-wired serial communication bus. The serial communication bus may be arranged to carry out communications according to an industry standard protocol, including but not limited to, SAE J1939 and/or one of several proprietary bus protocols. For example, SAE 2497 is a protocol that can be used on a power line communication (PLC) carries data on a conductor that can also be used simultaneously for electric power transmission. SAE J1939 is an example protocol that can be used on a controller area network (CAN). A discrete hard-wired logic line could alternatively be used as the communication path.

The tractor controller 38 includes a processing unit 38a. The processing unit 38a includes control logic 38b and is in communication with tractor air control valve 65 and is also in communication with at least one of towed-vehicle controllers 68, 88, 108, 128, and 148. The processing unit 38a may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit.

The tractor control logic 38a receives data messages from at least one of the towed-vehicle controllers 68, 88, 108, 128, and 148. The control messages include a time value and a unique identification for each towed vehicle. The time value can include a time stamp of the actual time the towed-vehicle controller receives the start signal and the time it receives the pneumatic pressure signal, for example. Alternatively, the time value can include the time difference that a tractor-controller receives of the pressure signal after the start time, if for example, the tractor controller calculates Δt. The unique identification can be one of several numbers, signals or markings to distinguish one towed vehicle from another towed vehicle. Examples of unique identifications can include, but are not limited to, a vehicle identification number (VIN), or a serial number, for example.

Accordingly, in an aspect of the present invention the tractor controller of vehicle-train monitoring system includes an electrical control port for receiving a sync signal and a start signal, and a communications port for receiving data from a towed vehicle of a tractor-trailer vehicle. The tractor controller also includes a processing unit in communication with the electrical control port and the communications port, and includes control logic. The control logic is capable of receiving a data signal comprising a time value and a unique identification which corresponds to the towed vehicle, at the communications port, from the towed vehicle in response to the electrical start signal. The control logic is capable of determining, at a predetermined response time, the position of the towed vehicle in the tractor-trailer vehicle based on the data signal received. In another example, the control logic is capable of determining at least one of the position of the towed-vehicle in the vehicle train and the length of the towed-vehicle of the tractor-trailer vehicle.

A system for monitoring a tractor-trailer vehicle includes: the tractor controller described above; a tractor pneumatic control valve; a stoplight switch in communication with the tractor pneumatic control valve and a towed-vehicle of the tractor-trailer vehicle train; and a tractor pneumatic source in communication with the tractor pneumatic control valve and the towed-vehicle of the tractor-trailer vehicle.

In another aspect of the present invention, a towed-vehicle controller of a vehicle-train monitoring system includes a first electrical control port for receiving an electrical signal, for example a sync signal and/or a start signal, from a tractor, a second electrical control port for receiving an electronic pressure signal from a pneumatic source of the tractor, and a communications port for transmitting data. A processing unit of the towed-vehicle controller includes control logic and is in communication with the first electrical control port, the second electrical control port and the communications port, and includes control logic capable of: transmitting a data signal comprising a time value and a unique identification to the tractor in response to receiving an electronic pressure signal from an pneumatic source of the tractor. A system for monitoring a tractor-trailer vehicle includes: the towed-vehicle controller described above, a tractor controller, a stoplight switch in communication with the tractor controller and a towed-vehicle of the tractor-trailer vehicle, and a tractor pneumatic source which is in communication with the towed-vehicle of the tractor-trailer vehicle.

Figure 3:
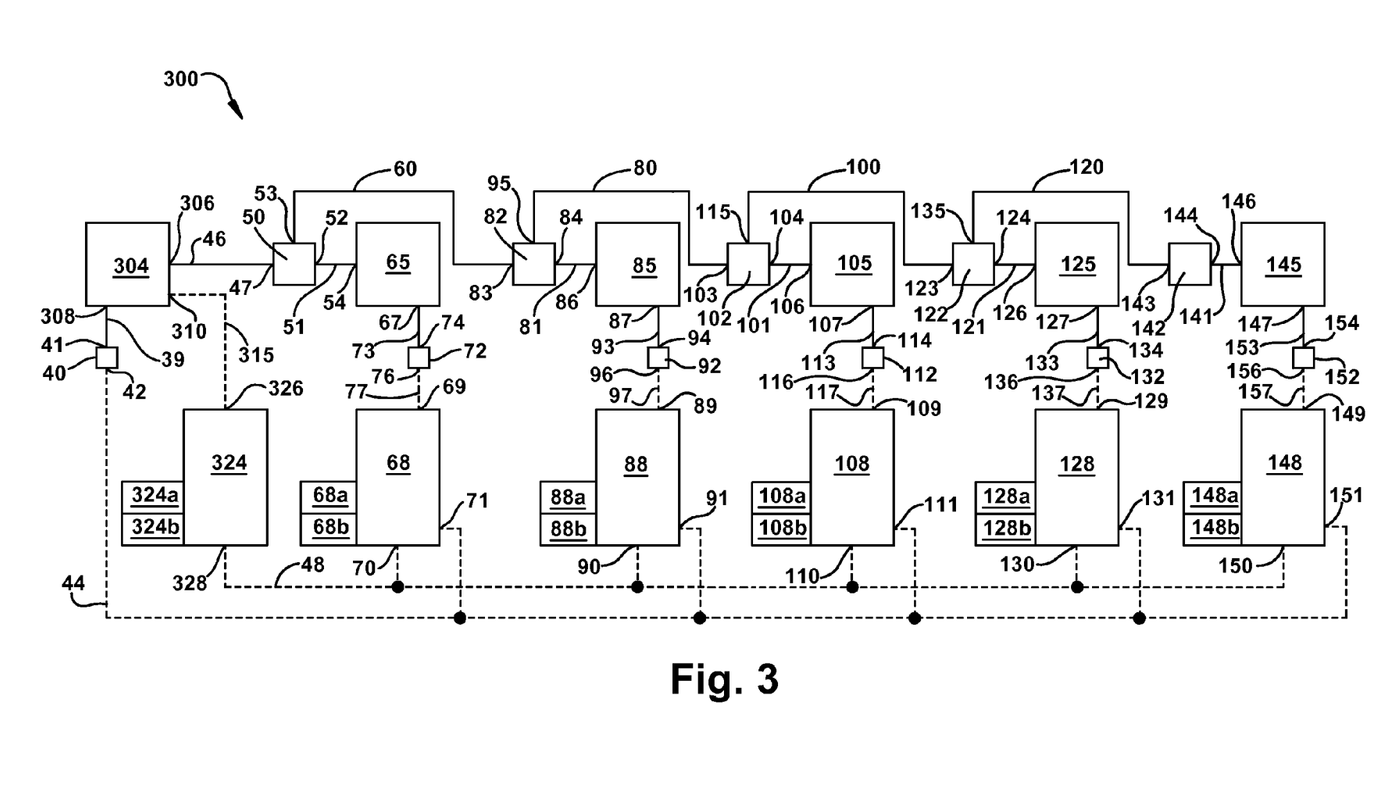

In another example, the initiation of a vehicle train monitoring system can be automatic rather than manual. FIG. 3 is a schematic illustration of a vehicle-train monitoring system 300 of tractor-trailer vehicle 10 shown in FIG. 1, according to another aspect of the present invention. Accordingly, in one example tractor controller 324 initiates the vehicle monitoring system by sending an electrical signal from port 326 along electrical path 315 to port 310 of tractor pneumatic source 304, for example an pneumatic valve that is electrically controlled, an "electro-pneumatic valve". An example of pneumatic source 204 is the ATR-6™ antilock traction relay valve from Bendix Commercial Vehicle Systems, LLC of Elyria, Ohio. The pneumatic source 304, when activated, can convey low pressure, for example up to about 6 psi of air pressure, via pneumatic line 39 to input port 41 of stoplight switch 40 which transmits an electrical signal via output port 42 along electrical line 44 to at least one towed vehicle in the vehicle train. For example, electrical signal is transmitted along stoplight switch electrical line 44 to SLS input ports 71, 91, 111, 131 and 151 of towed-vehicles controllers 68, 88, 108, 128 and 148 of towed vehicles 16, 18, 20, 22 and 24 (FIG. 1).

That is, monitoring system 300 for determining at least one of, the position, sequence, and length of the towed vehicles in the tractor-trailer vehicle train can be initiated automatically with the turn of an ignition key each time the tractor vehicle is turned on, for example. As described above with reference to FIG. 2, each of the control valves 65, 85, 105, 125, and 145 in FIG. 3 can be combined with each of the towed-vehicle controllers 68, 88, 108, 128, and 148, respectively as a single unit in each towed vehicle. For example, control valve 65 can be combined with towed-vehicle controller 68 as a single unit. In another example, each of the pressure sensors, 72, 92, 112, 132, and 152 can also be included with a control valve and a towed-vehicle controller, such as for example, an integrated unit that includes control valve 65, towed-vehicle controller 68 and pressure sensor 72.

The tractor controller 324 includes a processing unit 324*a*. The processing unit 324*a* includes control logic 324*b* and is in communication with tractor air control valve 304 and is also in communication with at least one of towed-vehicle controllers 68, 88, 108, 128, and 148. The processing unit 324*a* may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The control logic 324*b* receives control data messages from at least one of the towed vehicle controllers 68, 88, 108, 128, and 148. The control messages include a time value and a unique identification for each towed vehicle.

In the examples described above, tractor controllers 38 (FIG. 2) and 324 (FIG. 3) can be stand-alone controllers of the vehicle-train monitoring systems herein or alternatively a controller that can be combined with another controller in the tractor-trailer vehicle. For example, in one aspect, tractor controllers 38 and 324 can manage the antilock braking system and/or electronic stability control functions in addition to monitoring the towed portion of vehicle train of the tractor-trailer vehicle. Alternatively, tractor controllers 38 and 324 can manage another function in the tractor-trailer system.

Accordingly, in an aspect of the present invention, the tractor controller as depicted in FIG. 3 of a tractor-trailer vehicle includes an electrical control port for transmitting an electrical signal to a tractor pneumatic source, and a communications port for receiving data. A processing unit of the tractor controller is in communication with the electrical control port and the communications port and includes control logic. The control logic is capable of: transmitting a sync signal to the towed vehicle train, then transmitting an electrical start signal to a tractor pneumatic source at a predetermined time period after transmitting a sync signal; receiving a first data signal comprising a time value and a unique identification at the communications port from the towed vehicle in response to transmitting the electrical start signal and the pneumatic signal; and at a predetermined response time, calculating the position of the towed vehicle in the tractor-trailer vehicle based on the time value received. A system for monitoring a tractor-trailer vehicle includes: the controller described above, a stoplight switch in communication with the tractor controller and a towed-vehicle of the tractor-trailer vehicle, and a tractor pneumatic source which is in communication with the towed-vehicle of the tractor-trailer vehicle train. As described above with respect to FIG. 3, the initiation of a vehicle train monitoring system can be automatic rather than manual.

Figure 4:
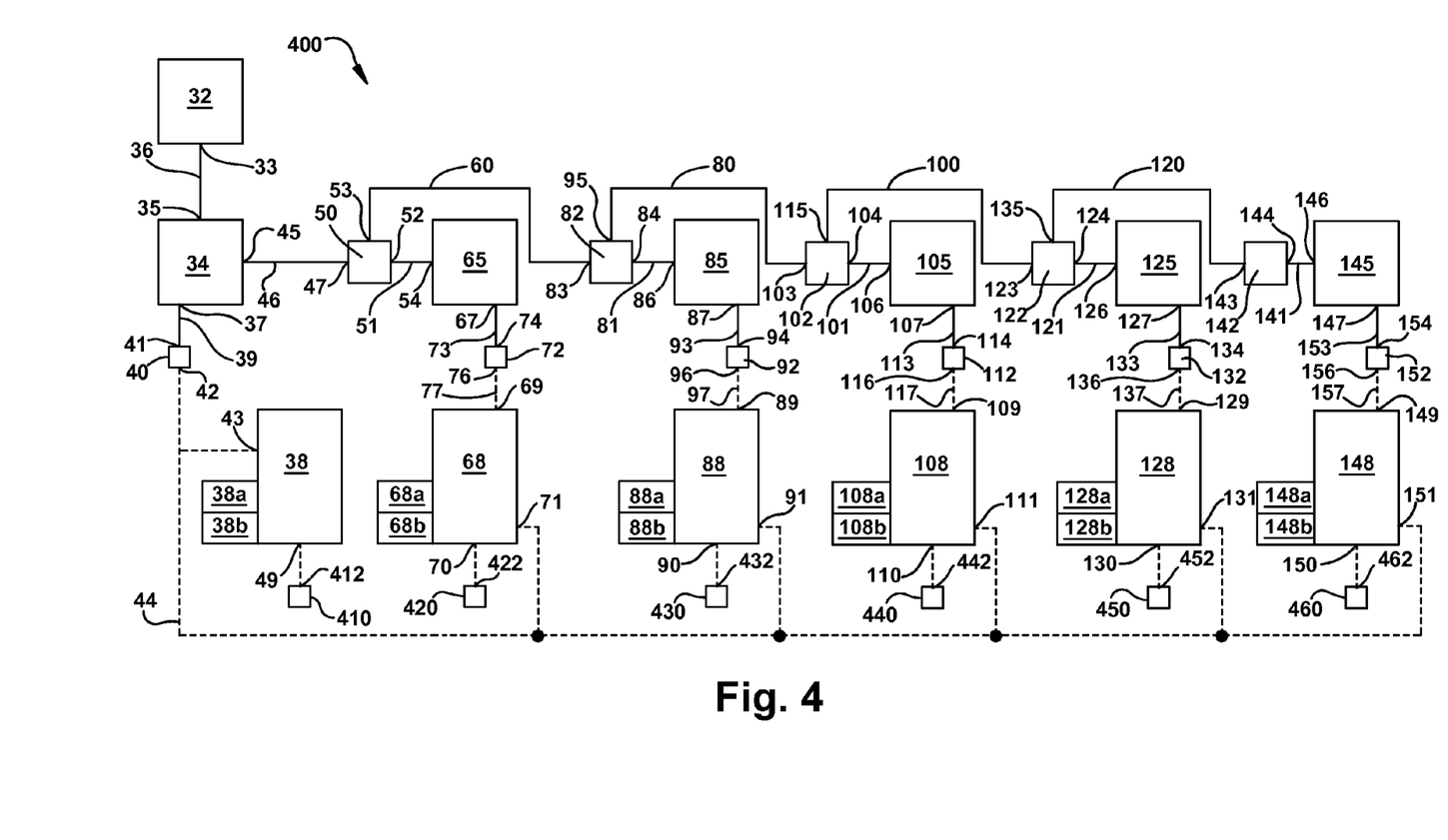
Figure 5:
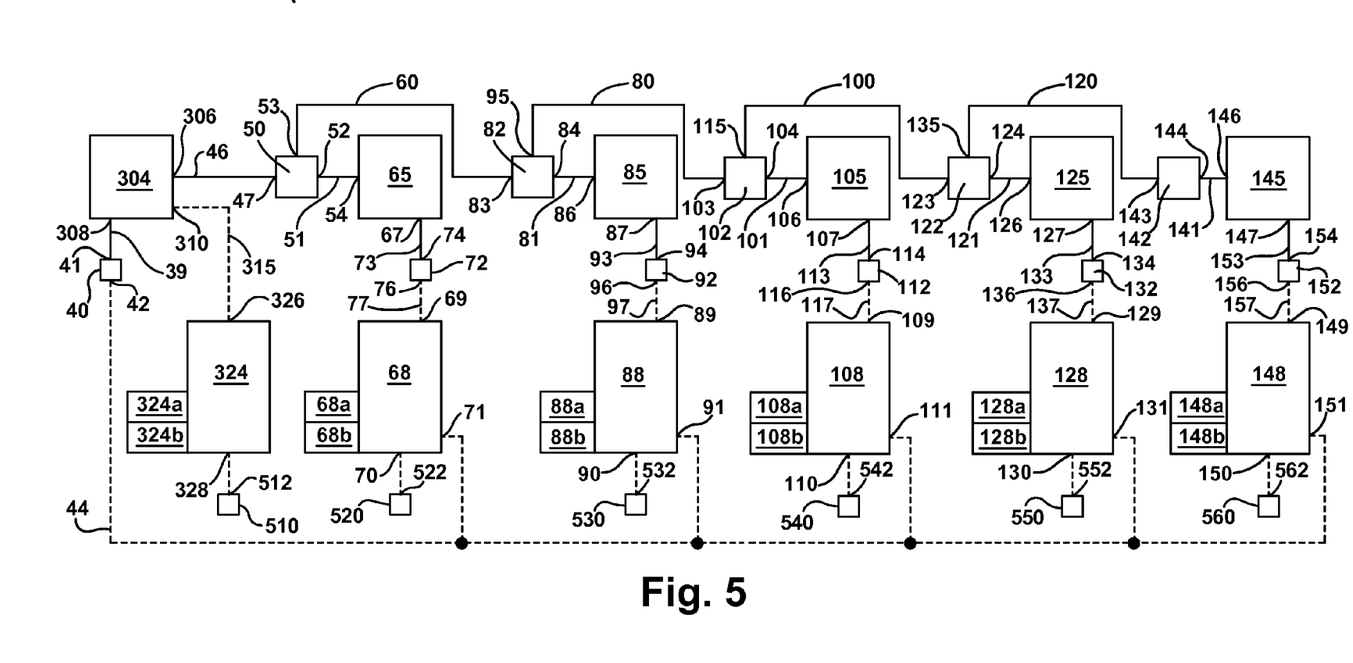

FIG. 4 is a schematic representation of the manually-initiated tractor-trailer vehicle control system 400 which is similar to FIG. 2 above and includes wireless transmitter and receivers for communication. System 400 includes tractor wireless receiver and transmitter 410 having bi-directional communication port 412 and communicates with tractor controller 38. Each of the towed-vehicle controllers 68, 88, 108 and 128 can be equipped with wireless receivers and transmitters 420, 430, 440, 450 and 460 which communicate with tractor controller 38. FIG. 5 is a schematic representation of the controller-initiated tractor-trailer vehicle control system 500 which is similar to FIG. 3 above which includes wireless transmitter and receivers for communication. System 500 includes tractor wireless receiver and transmitter 510 having bi-directional communication port 512 and which communicates with tractor controller 324. Each of the towed-vehicle controllers 68, 88, 108 and 128 can be equipped with wireless receivers and transmitters 520, 530, 540, 550 and 560 which communicate with the with tractor controller 324.

In both FIGS. 4 and 5 the wireless receiver/transmitters decode the time value and unique identification information from the selected data format to a time value and unique identification message capable of being communicated. The format of the data may be a standard protocol and can include, but is not limited to, a RKE protocol, a Zigbee protocol, a BlueTooth protocol, and an IEEE 802.11 protocol, for example. In alternative examples the wireless receiver/transmitters are integrated with controller 38 and 324. In this arrangement, the control logic 38b and 324b receives the data sent from the towed vehicle controllers 68, 88, 108, 128, and 148. The data sent from the towed vehicle controllers can include a time value and unique identification from the towed vehicles in response to receiving the electrical start signal and the pneumatic signals from the tractor. If for example, there are no towed vehicles, i.e. tractor is "bobtail" then tractor controllers 38 and 324 will not receive a response via a hard-wired communication line or via the wireless transmitters.

In another aspect, a method for monitoring a vehicle of a tractor-trailer vehicle train includes: transmitting an electronic sync signal from a tractor vehicle to a first towed vehicle of the tractor-trailer vehicle; transmitting an electrical start signal and an electronic pressure signal to the first towed vehicle at a predetermined time period from the sync signal; transmitting a first data signal from the first towed vehicle to the tractor vehicle, the first data signal comprising a first time value and a first unique identification in response to the transmission of the electrical start signal and the electronic pressure signal; and determining, at a predetermined response time, the position of the towed vehicle based on the first time value received. In another example, the method further includes transmitting a second data signal from a second towed vehicle to the tractor vehicle, and the second data signal comprises a second time value and a second unique identification in response to transmission of the electrical start signal and the electronic pressure signal. At a predetermined response time the position of the second towed vehicle is determined based on the second time value.

Figure 6:
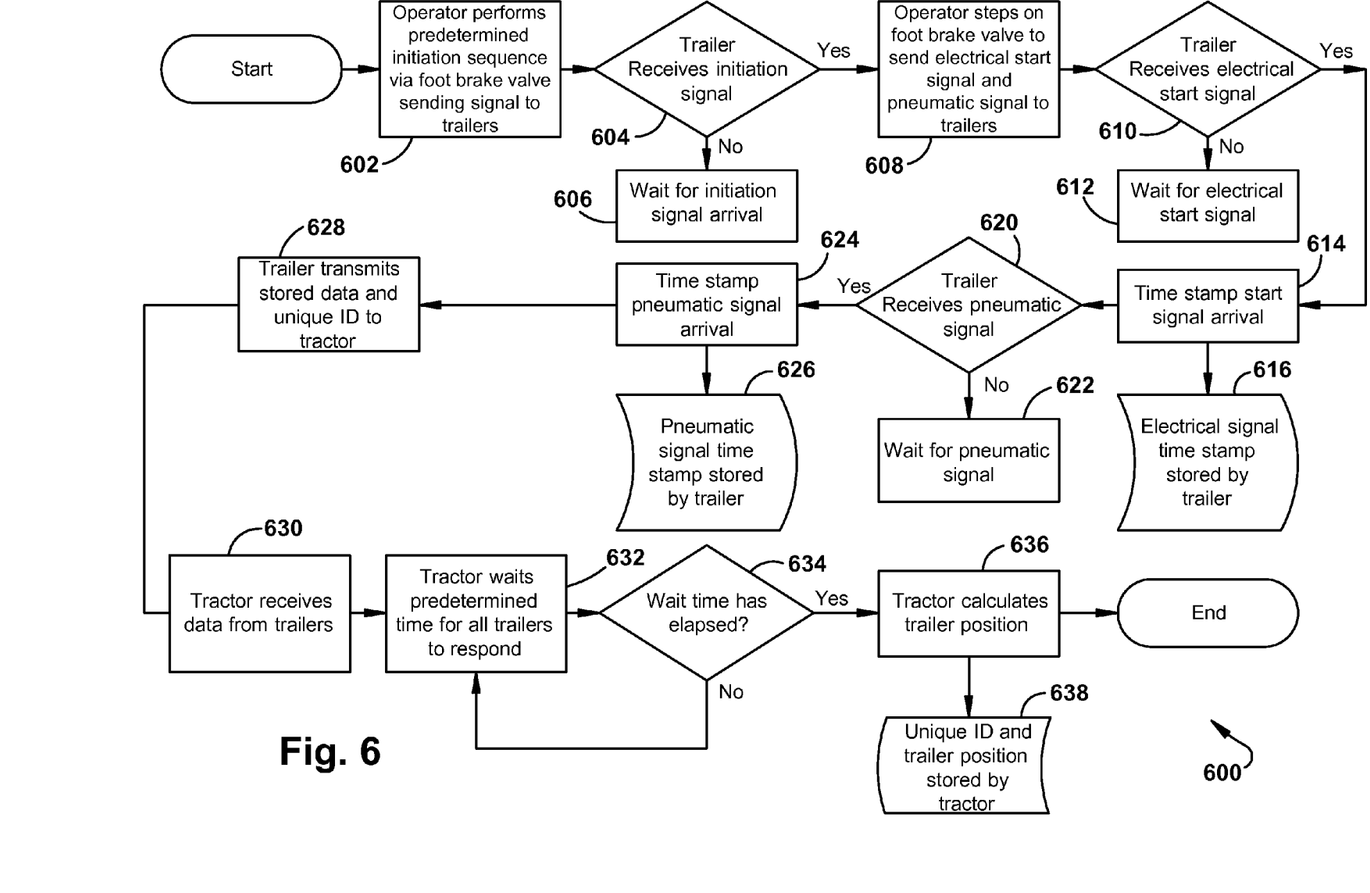
FIGS. 6 and 7 illustrate methods of implementing the vehicle train sensor system, according to example embodiments of the present invention.

A flowchart illustration for implementing a method 600 for monitoring the vehicle train of a tractor-trailer vehicle, in accordance with an aspect of the present invention is shown in FIG. 6. Method 600 starts when operator of the vehicle performs an initiation sequence, for example via depressing the foot brake valve which sends an electrical sync signal to tractor controller and at least one towed vehicle of towed vehicle train 14 (FIG. 1), as depicted at box 602. The method checks whether electrical sync signal is received by at least one towed-vehicle controller 68 (FIG. 2) as depicted in box 604. For example, a sync signal is sent to tractor controller and towed-vehicle controllers 68, 88, 108, 128, and 148 of towed vehicles 16, 18, 20, 22, and 24, respectively (FIG. 1). The tractor controller 38 monitors the time at which the tractor sent the control signal as depicted at box 606 and after a predetermined time has passed, the operator sends a start signal, for example by depressing the foot brake valve again as depicted at box 608, which resets the time, for example the start signal is assigned as time zero, t=0. The predetermined time period can vary as mentioned above. The operator also sends a pneumatic signal to towed-vehicle air control valve 65 which sends a pneumatic control signal to pneumatic control valve 62 of towed vehicle 16, for example. Towed-vehicle controller 68 continues to check for the receipt of electrical start signal as depicted at box 610 and waits until the electrical start signal is received as depicted at box 612. The time difference, Δt, is stored.

Once towed-vehicle controller 68 of at least one towed vehicle receives the start signal, the towed-vehicle controller stamps the arrival of start signal at the towed vehicle as depicted by box 614, and the time stamp is stored by the towed-vehicle controller as depicted by box 616. Next, the towed-vehicle controller 68 checks for the receipt of the pneumatic air signal depicted by box 620 and the towed-vehicle controller waits for receipt of the pneumatic signal as depicted by box 622. Next, the towed-vehicle controller time stamps the arrival of the pneumatic signal conveyed by the pneumatic pressure sensor, for example pressure sensor 72 (FIG. 2), as depicted at box 624, and the time stamped and is stored by the towed vehicle controller as depicted at box 626. In an alternative example (not shown), towed-vehicle controller 68 then calculates the time difference between the electronic start signal and the electronic pressure signal, at that particular towed vehicle.

Once the towed-vehicle controller 68 receives the time stamp of the pneumatic signal, the controller transmits data to the tractor controller 38, as depicted by box 628 and the tractor controller 39 receives the data from at least one towed-vehicle as depicted at box 630. The data or information transmitted to the tractor controller 38 includes a "time value," which is the time stamp of the electronic pressure signal, and a unique identification for that specific towed vehicle.

Figure 8:
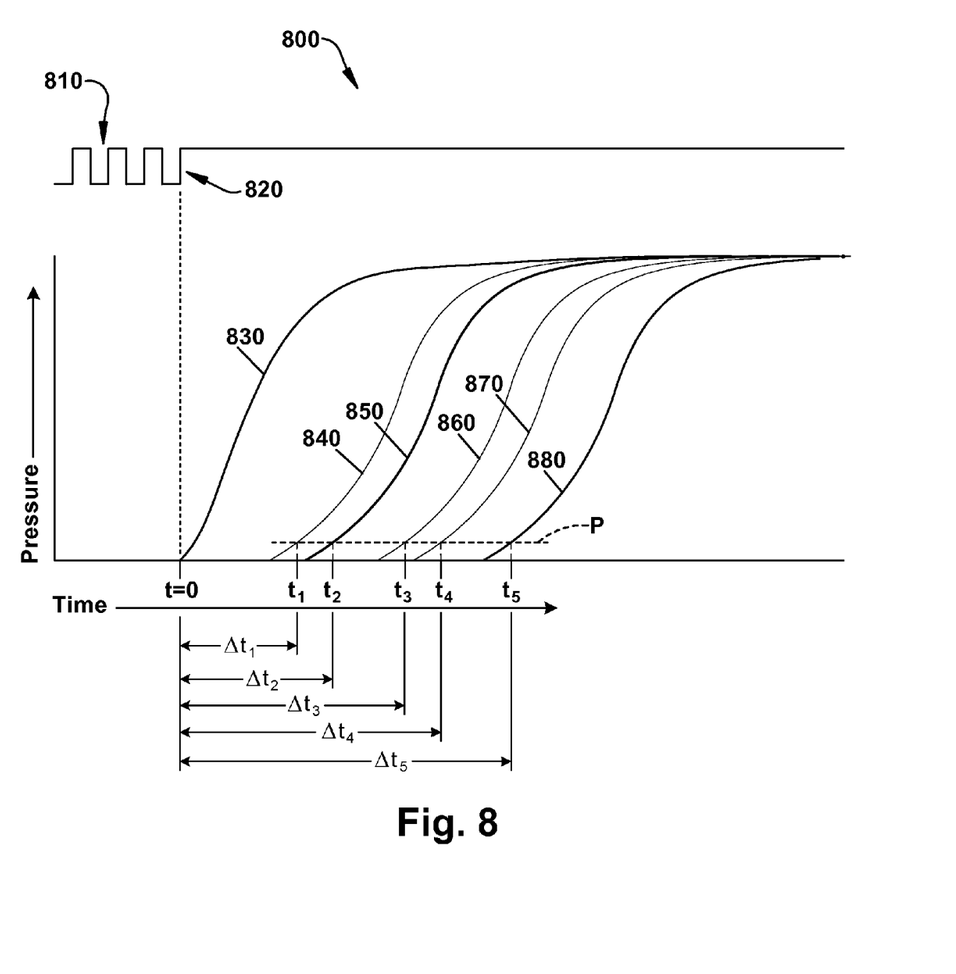
FIG. 8 illustrates a graph representing the pressure response times of the vehicle train sensor system, according to an example embodiment of the present invention.

Referring still to FIG. 6 the control logic or method described above is repeated in each of the towed vehicle controllers, for example controllers 88, 108, 128, and 148 of vehicles 18, 20, 22, and 24, respectively. That is, tractor controller 38 eventually receives data from each of the towed vehicles. The time between the electrical start signal and the pneumatic signal is different for each towed vehicle due, at least in part, to the distance of the towed vehicle from the tractor. As can be seen in FIG. 8 the time value for each vehicle is represented as $\Delta t_1$, $\Delta t_2$, $\Delta t_3$, $\Delta t_4$, and $\Delta t_5$, respectively. The tractor controller 38 waits a "predetermined response time" for all towed vehicles to respond as depicted by box 632. The predetermined time can range from about 0.1 to about 5 seconds, in another example from about 0.2 seconds to about 3 seconds. The tractor controller 38 continues to check for the elapsed response time equal against the predetermined elapsed time as depicted by box 634.

Once the time as elapsed for all the towed vehicles to respond, tractor controller 44 determines the position of each towed vehicle behind the tractor as depicted by box 636. The control logic determines the positions of the towed vehicles by calculating the time difference between the electronic start signal and the electronic pressure signal for each particular towed vehicle and then ranking the first time value, the second time value, and so on, from lowest to highest. The controller then assigns the positions such that the towed vehicle with the lowest time value is assigned a location that is closest to the tractor and the towed vehicle with the highest time value is assigned a location that is furthest from the tractor as depicted by box 638. The positions are calculated for each corresponding towed vehicle having a unique identification associated with it. The tractor controller 38 stores the unique identification and the correct sequence of each towed vehicle behind the tractor. In another example, the tractor controller calculates the length of each vehicle based on the time value. The tractor controller can include stored data that associates the time value with a distance from the tractor and/or stored data that associates the time value with the length of the towed vehicle. In a vehicle-train that includes towed-vehicles which do not have a controller or ECU the tractor controller can nevertheless determine the sequence of vehicles in the vehicle train based on the time values.

Figure 7:
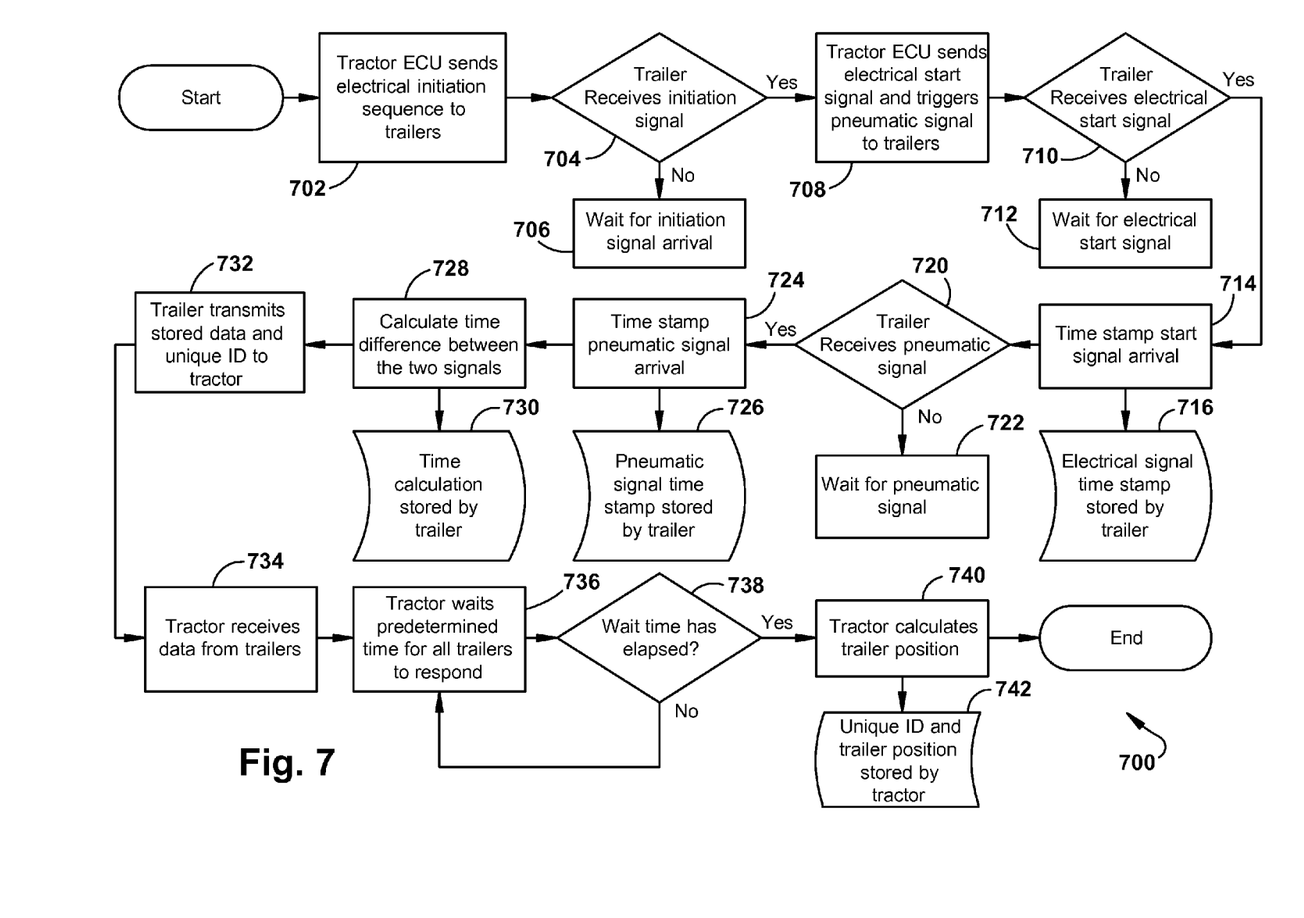

In another aspect of the present invention a flowchart illustration for implementing a method 700 for monitoring the vehicle train of a tractor-trailer vehicle, in accordance with an example of the present invention is shown in FIG. 7. Method 700 starts when tractor controller 324 sends an electrical sync signal to towed vehicles as depicted at box 702. The tractor controller 324 may send a single control signal or may send multiple control signals in a predetermined event sequence, such as a pulse width modulated format, for example. The towed-vehicle controller 64 monitors the time at which the tractor controller 324 sent the control signal as depicted at boxes 704 and 706 and after a predetermined time has passed, tractor controller 324 sends an electrical start signal depicted at box 708, which time stamps the start time, for example t=0. The time between the electrical sync signal and the electrical start signal can vary as mentioned above. The tractor controller 324 also sends a pneumatic signal to air control valve 304 which sends a pneumatic control signal to a pneumatic control valve, for example pneumatic control valve 65 of towed vehicle 16, although this can apply to one or more of the towed vehicles in the vehicle train. Towed-vehicle controller 65 continues to check for the receipt of electrical start signal as depicted at box 710 and waits until the electrical start signal is received as depicted at box 712.

Once the at least one towed-vehicle controller 65 receives the start signal, the towed-vehicle controller stamps the arrival of start signal at the towed vehicle as depicted by box 714, and the time stamp is stored by the controller of the towed vehicle as depicted by box 716. Next, the towed-vehicle controller 68 checks for the receipt of the pneumatic air signal depicted by box 720 and the controller checks for receipt of the pneumatic signal as depicted by box 722. Next, the controller time stamps the arrival of the pneumatic signal conveyed by the pneumatic pressure sensor, for example pressure sensor 72, as depicted at box 724. The pneumatic signal is time stamped and stored by the towed vehicle controller as depicted at box 726. As depicted by box 728, towed-vehicle controller 68 then calculates the time difference between the electronic start signal and the electronic and the pneumatic signal at that particular towed vehicle and the time difference, $\Delta t$, between the start signal and the pneumatic signal is stored by the towed-vehicle controller. In an alternative example, the functions depicted in boxes 728 and 730 are not performed by the towed-vehicle controller and the time value is the time stamp of the pneumatic signal arrival denoted in box 724.

Once the at least one towed-vehicle controller, for example towed-vehicle 68, is received, the towed-vehicle controller transmits data to the tractor controller 324, as depicted by box 732 and 734. The data or information transmitted to the tractor controller 324 depicted at box 734 includes a unique identification for that specific towed vehicle, a "time value," which can be the time stamp, or in another example the calculated time change between the start signal and the pneumatic signal. The control logic or method described above is repeated in each of the towed vehicle controllers, for example controllers 88, 108, 128, and 148 of vehicles 18, 20, 22, and 24, respectively. That is, tractor controller 324 eventually receives data from each of the towed vehicles as denoted in box 734. The time value, whether it includes a time stamp or a time difference between the electrical start signal and the pneumatic signal, is different for each towed vehicle due, at least in part, to the distance of the towed vehicle from the tractor and/or the length of the towed vehicle. The tractor controller 324 waits a predetermined response time for all towed vehicles to respond as depicted by box 736. The response time can range from about 0.1 to about 5 seconds, in another example from about 0.1 seconds to about 5 seconds. The tractor controller 324 continues to check for the elapsed time from the start time until it equals to the predetermined response time, as depicted by box 740.

Once the time as elapsed for the towed vehicles to respond, tractor controller 324 calculates the position of each towed vehicle behind the tractor as depicted by box 740. The control logic calculates the positions of the towed vehicles by ranking the first time value, the second time value, and so on, from lowest to highest. The tractor controller then assigns the positions such that the towed vehicle with the lowest time value is assigned a location that is closest to the tractor and the towed vehicle with the highest time value is assigned a location that is furthest from the tractor. The positions are calculated for each corresponding towed vehicle having a unique identification associated with it. The tractor controller 324 stores the unique identification and the correct sequence of each towed vehicle behind the tractor as depicted in box 742.

FIG. 8 is an illustrative graph of pressure versus time received by the pneumatic control valves, or relay valves, of the towed vehicles, for example, pneumatic control valves 65, 85, 105, 125, and 145 (FIG. 2) of towed vehicles 16, 18, 20, 22, and 24 (FIG. 1). The wave signal 810 prior to time zero, t=0, represents the electrical sync sequence that can be generated in a variety of ways. For example, the electrical sync sequence can be generated manually by the vehicle operator as described above with reference to FIGS. 2, 4, and 6, or as another example, the sync sequence can be generated by the tractor controller 34 as described above with reference to FIGS. 3, 5, and 7. The electronic start signal is substantially instantaneous across the controllers and at start time, t=0 a pneumatic signal which is substantially slower, is also sent at t=0 from pneumatic valve 65 (via sensor 72) and is realized by towed vehicles at different times represented by $t_1$, $t_2$, $t_3$, $t_4$, and $t_5$, respectively. The pneumatic signal from the tractor is represented by curve 830 and a predetermined pressure, P, reaches the towed-vehicle controllers of towed vehicles 16, 18, 20, 22, and 24 at different times based at least on their distances from the tractor due to the time the air takes to travel to the towed vehicles, and also the length of the vehicle. These different times that towed vehicles 16, 18, 20, 22, and 24 achieve a predetermined pressure, P, at an elapsed time from the start signal are represented by the pressure curves 840, 850, 860, 870, and 880, respectively and times $t_1$, $t_2$, $t_3$, $t_4$, and $t_5$, respectively. The time difference between the start signal at time zero t=0 and the time each towed vehicle receives the pneumatic signal is calculated by the tractor controller and is represented as time value $\Delta t_1$, $\Delta t_2$, $\Delta t_3$, $\Delta t_4$, and $\Delta t_5$, respectively. In additional examples the time difference is calculated by each of the towed-vehicle controllers.

The time value determined by each towed vehicle controller, whether a time stamp or a calculated time difference, is communicated to the tractor controller. The tractor controller ranks the various time values and determines the positions of each towed vehicle, or the towed-vehicle sequence behind the tractor. For example time value $\Delta t_5$ is the greatest value and is furthest from the tractor, whereas time value $\Delta t_1$ is the lowest value and is closest to the tractor. Based on known tractor-trailer vehicles and pneumatic systems, the time values for a particular pneumatic brake system would allow the tractor controller to determine the location or distance of the towed vehicle from the tractor. Therefore, if one or more towed vehicle does not include a controller, the tractor controller can still determine the position and/or the sequence of the vehicles that do have a towed-vehicle controller according to the aspects described herein. Moreover, the tractor controller can determine the type of towed vehicle based on the data or the time value reported, for example, whether the towed vehicle is a dolly or a trailer, and the length of the towed vehicle.

While the present invention has been illustrated by the description of aspects thereof, and while the examples have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A tractor controller of a tractor in a tractor-trailer vehicle train comprising:
    an electrical control port for receiving an electrical sync signal and an electrical start signal;
    a communications port for receiving data from a towed vehicle of a tractor-trailer vehicle train that receives the electrical sync signal and the electrical start signal;
    a processing unit comprising control logic, wherein the processing unit is in communication with the electrical control port and the communications port, wherein the control logic is capable of:
        receiving a data signal at the communications port in response to the towed vehicle receiving the electrical start signal, wherein the data signal comprises a time value that corresponds to the towed vehicle and a unique identification that corresponds to the towed vehicle; and
        calculating the position, at a predetermined response time, of a towed vehicle in the tractor-trailer vehicle train based on the first data signal received.

2. The tractor controller of claim 1, wherein the control logic determines the length of the towed vehicle based on the data signal received.

3. The tractor controller of claim 1, wherein the electrical sync signal, the electrical start signal, and an electronic pressure signal are received by a towed-vehicle controller of the towed vehicle.

4. The tractor controller of claim 1, wherein the electrical start signal and a pneumatic signal are transmitted to the first towed vehicle at a predetermined time period following transmission of the sync signal to the towed vehicle.

5. The tractor controller of claim 1, wherein the time value received by the tractor controller is a time stamp indicating the elapsed time the towed vehicle received an electronic pressure signal from an electric-pneumatic source in the tractor, wherein the elapsed time starts from a time the electronic start signal is received by the towed vehicle.

6. The tractor controller of claim 1, wherein the time value received by the tractor controller is the time difference, $\Delta t$, between a time the towed vehicle receives the electrical start signal and the time the towed vehicle receives an electronic pressure signal from a pneumatic source of the tractor.

7. The tractor controller of claim 1, wherein the electrical start signal and a pneumatic signal are transmitted to the tractor controller and towed vehicle at a predetermined time period following transmission of the sync signal to the tractor controller and the towed vehicle.

8. The tractor controller of claim 1, wherein the predetermined response time at which the position of the towed vehicle is calculated ranges from about 0.1 seconds to about 5 seconds.

9. The tractor controller of claim 1, wherein the time value received is the only time value received by the tractor controller at the expiration of the predetermined response time, and the control logic calculates the position of the first towed vehicle to be in a position adjacent to the tractor of the tractor-trailer vehicle train.

10. The tractor controller of claim 1, wherein the control logic is further capable of:
    receiving a second data signal associated with a second towed vehicle, the second data signal comprising a second time value different than the time value and a second unique identification different than the unique identification; and
    calculating the position, at the predetermined response time, of the second towed vehicle based on the second time value received by the tractor controller.

11. The tractor controller of claim 10, wherein:
    the control logic calculates the position of the towed vehicle and the second towed vehicle by ranking the time value and second time value from highest to lowest, and determining that a towed vehicle having a lowest time value ranking has a position that is closest to the tractor and a towed vehicle having a highest time value ranking has a position that is farthest from the tractor.

12. The tractor controller of claim 10, wherein the control logic calculates the length of the second towed vehicle based on the second time value.

13. The tractor controller of claim 10, wherein the electrical start signal and an electronic pressure signal are transmitted to the second towed vehicle at a predetermined time period following transmission of the sync signal to the second towed vehicle.

14. The tractor controller of claim 1, wherein the communications port is electrically connected to a hard wired serial communications bus.

15. The tractor controller of claim 1, wherein the communications port is configured to receive wireless communication.

16. The tractor controller of claim 10, wherein the electrical sync signal, the electrical start signal, and an electronic pressure signal are received by a towed-vehicle controller of the second towed vehicle.

17. The tractor controller of claim 1, wherein the tractor controller receives the electronic sync signal and the electronic start signal from a stoplight switch.

18. The tractor controller of claim 1, wherein:
    the electrical sync signal is transmitted from a tractor stoplight switch to a towed-vehicle controller and a second towed-vehicle controller of tractor-trailer vehicle train; and
    the electrical start signal, and an electronic pressure signal are transmitted to a towed-vehicle controller of the tractor-trailer vehicle train.

19. A tractor controller comprising:
    an electrical control port for transmitting an electrical control signal to a tractor pneumatic source;
    a communications port for receiving data;
    a processing unit comprising control logic, wherein the processing unit is in communication with the electrical control port and the communications port, wherein the control logic is capable of:
        transmitting an electrical sync signal to the towed vehicle train;
        transmitting, an electrical start signal and an electronic pressure signal to a tractor pneumatic source at a predetermined time period after transmitting the sync signal;
        receiving a first data signal comprising a first time value and a first unique identification at the communications port from the towed vehicle in response to transmitting the electrical start signal and the electronic pressure signal;

calculating, at a predetermined response time, the position of the first towed vehicle in the tractor-trailer vehicle based on the first time value received.

20. The tractor controller of claim 19, wherein the control logic determines the length of the first towed vehicle based on the data signal received.

21. A towed-vehicle controller of a tractor-trailer vehicle comprising:
a first electrical control port for receiving an electrical sync signal and an electrical start signal from a tractor;
a second electrical control port for receiving an electronic pressure signal from a pneumatic source of the tractor;
a communications port for transmitting data;
a processing unit comprising control logic wherein the processing unit is in communication with the first electrical control port and the second electrical control port and the communications port, and includes control logic capable of:
transmitting a data signal comprising a time value and a unique identification to the tractor in response to receiving an electronic pressure signal from the pneumatic source of the tractor.

22. The towed-vehicle controller of claim 21, wherein the time value transmitted by the towed-vehicle controller is a time stamp of the elapsed time the towed vehicle receives an electronic pressure signal from the pneumatic source of the tractor, wherein the elapsed time starts from the time the electronic start signal is received by the towed vehicle.

23. The towed-vehicle controller of claim 21, wherein the time value is determined by the difference in time that the towed-vehicle controller receives the electronic start signal and the time that the towed-vehicle controller receives the electronic pressure signal.

24. The towed-vehicle controller of claim 21, wherein the first data signal is transmitted to the tractor controller comprising control logic, and the control logic calculates the position of the towed-vehicle based on the time value.

25. The towed-vehicle controller of claim 21, wherein the communications port is electrically connected to a hard-wired serial communications bus.

26. The towed-vehicle controller of claim 21, wherein the communications port is configured to receive wireless communication.

27. A method for monitoring a vehicle train of a tractor-trailer vehicle, the method comprising:
transmitting an electronic sync signal from a tractor vehicle to a first towed vehicle of the tractor-trailer vehicle;
transmitting an electrical start signal and an electronic pressure signal to the first towed vehicle at a predetermined time period from the sync signal;
transmitting a first data signal from the first towed vehicle to the tractor vehicle, the first data signal comprising a first time value and a first unique identification in response to transmission of the electrical start signal and the electronic pressure signal;
determining, at a predetermined response time, the position of the towed vehicle based on the first time value received.

28. The method of claim 27, further comprising:
determining the length of the first towed vehicle based on the time value received.

29. The method of claim 27, further comprising:
transmitting a second data signal from a second towed vehicle to the tractor vehicle, the second data signal comprising a second time value and a second unique identification in response to transmission of the electrical start signal and the electronic pressure signal; and
determining, at a predetermined response time, the position of the second towed vehicle based on the second time value received.

30. The method of claim 29, wherein determining the positions of the first towed vehicle and the second towed vehicle is achieved by ranking the first time value and second time value from lowest to highest, and assigning the positions such that the lowest time value is assigned a location that is the closest distance to the tractor and the highest time value is assigned a location that is furthest distance from the tractor.

31. The method of claim 29, wherein the method further comprises determining the length of the second towed vehicle based on the second time value received.

32. The method of claim 27, wherein the first time value is the time stamp of the time the first towed vehicle receives the electronic pressure signal or the time difference, $\Delta t$, between the electronic start signal and the time the first towed vehicle receives the electronic pressure signal.

33. A system for monitoring a tractor-trailer vehicle comprising:
a pneumatic control valve;
a stoplight switch in communication with the manually-operated pneumatic control valve and a towed vehicle of the tractor-trailer vehicle;
a tractor pneumatic source which is in communication with the pneumatic control valve and the towed vehicle of the tractor-trailer vehicle;
a tractor controller comprising:
an electrical port for receiving an electrical sync signal and an electrical start signal;
a communications port for receiving data from a towed vehicle of a tractor-trailer vehicle that receives the electrical sync signal and the electrical start signal;
a processing unit comprising control logic, wherein the processing unit is in communication with the communications port, wherein the control logic is capable of:
receiving a first data signal comprising a first time value and a unique identification which corresponds to the towed vehicle at the communications port from the towed vehicle that responds to the electrical start signal;
determining, at a predetermined response time, the position of a towed vehicle in the tractor-trailer vehicle based on the data signal received.

34. The system of claim 33, wherein the tractor controller determines the length of the towed vehicle based on the data signal received.

* * * * *